United States Patent [19]

Bourgeios

[11] Patent Number: 5,442,535
[45] Date of Patent: Aug. 15, 1995

[54] METHOD AND APPARATUS FOR CONTROLLING AN ELECTROMECHANICAL LOAD BY LEAST ONE PULSE SWITCH

[75] Inventor: John M. Bourgeios, Roqueford la Bedoule, France

[73] Assignee: SGS-Thomson Microelectronics S.A., Gentilly, France

[21] Appl. No.: 28,405

[22] Filed: Mar. 9, 1993

[30] Foreign Application Priority Data

Mar. 10, 1992 [FR] France .................. 92 02859

[51] Int. Cl.$^6$ .................. H02M 3/335
[52] U.S. Cl. .................. 363/16
[58] Field of Search .................. 363/16, 39, 41, 40, 363/123, 124

[56] References Cited

U.S. PATENT DOCUMENTS

4,638,417   1/1987   Martin, Jr. et al. .................. 363/41

FOREIGN PATENT DOCUMENTS

3539558   5/1987   Germany.
0206385   8/1990   Japan .................. 363/16
9012446   1/1990   WIPO.

*Primary Examiner*—Thomas M. Dougherty
*Attorney, Agent, or Firm*—Greenfield & Sacks

[57] ABSTRACT

A method and apparatus for reducing the acoustic noise of an electromechanical load. Switching frequencies are chosen so that the switching ripple is submerged in the natural noise of the load. This device includes a converter which, through use of one or more pulse switches, controls the load, a chopper circuit and a control unit, a random number generator being linked to the chopper.

14 Claims, 1 Drawing Sheet

5,442,535

METHOD AND APPARATUS FOR CONTROLLING AN ELECTROMECHANICAL LOAD BY LEAST ONE PULSE SWITCH

BACKGROUND OF THE INVENTION

1. Field of the Invention

This invention relates to a method for controlling an electromechanical load by at least one pulse switch converter and a device for implementing the method.

2. Discussion of the Related Art

The electronic control of electromechanical loads, and of motors in particular, is generally obtained by regulating current or voltage by means of chopping circuits. Signals such as binary signals are sent to pulse switches that provide dc currents or voltages for the electromagnetic loads according to the level of the chopping signal sent.

These chopper circuits induce high-frequency current ripples in the loads at multiples or sub-multiples of the working frequencies of the electronic switches. Thus the electromagnetic loads behave like loud-speakers, in such a way that these ripples cause acoustic noise at the corresponding frequencies.

Some solutions have already been proposed to avoid the drawback created by this acoustic noise. It is already known, in particular, how to make the switches operate using switching signals at inaudible frequencies (above 16 kHz) in the case of mono-switch systems, or, in the case of multi-switch systems, at frequencies such that the frequency of the resulting current ripple is inaudible.

These different solutions all propose switching at relatively high frequencies, and therefore impose the use of fast switches working at high switching speeds and for which supplemental filtering is also required to avoid generation of electromagnetic interference.

SUMMARY OF THE INVENTION

This invention is a new type of method for controlling electromechanical loads driven by electronic converters, and which allows the above-mentioned drawbacks of the prior art to be overcome.

In a general way, the invention does not set out to make the acoustic frequencies due to the switching currents inaudible (above 16 kHz), but to submerge these acoustic frequencies in the natural noise of the electromechanical load. The spectrum of these acoustic switching frequencies is spread according to a profile close to that of the load, the method of the invention making it possible, moreover, to avoid too great an acoustic intensity at these switching frequencies.

The object of this invention is therefore a method for controlling an electromechanical load driven by at least one electronic pulse switch converter, said converter receiving at least one binary switching signal defined by its cyclic ratio and switching period, said cyclic ratio being maintained at a level corresponding to the voltage or current intensity desired for the load, a ripple being induced on said voltage or current intensity by the switching signal(s), wherein the switching period and cyclic ratio of the switching signal are chosen in such a way that the induced ripple frequency is submerged in the natural noise frequencies of the load.

This method is advantageously completed by the following different characteristics taken alone or in any technically possible combination:

the switching period is variable, the mean of the switching period corresponding to the period of a frequency of the natural noise of the load;

a switching period comprises a conduction time and a blocking time, with a random element being introduced in terms of the switching period and/or the conduction time and/or the blocking time;

for a given natural noise level of the load and for a given load control intensity or voltage level, the blocking time or conduction time of each switching pulse is assigned a constant value according to both this intensity or voltage level and this mean switching period, a randomly chosen value being assigned to the supplementary blocking time or conduction time for the switching pulse;

the mean cyclic ratio $<d_i>$ desired for the switch is determined; it is then determined whether this mean cyclic ratio is greater or less than 50%, and if this mean cyclic ratio value is greater than 50%, the conduction time of a switching pulse is assigned a random value and the blocking time a predetermined constant value chosen in such a way that the cyclic ratio assumes the mean value $<d_i>$, if this mean cyclic ratio value is less than 50%, the blocking time of a switching pulse is assigned a random value and the conduction time a predetermined constant value chosen in such a way that the cyclic ratio assumes the mean value $<d_i>$;

the conducting and blocking times being in both cases brought to a temporal value such that the mean switching period assumes a value corresponding to the natural noise of the load;

when the mean cyclic ratio desired is greater than 50%, the predetermined value assumed by the constant blocking time of each switching pulse is equal to $(1-<d_i>)\alpha$ where $\alpha$ is a linearization coefficient;

when the mean cyclic ratio of the switch $<d_i>$ is less than 50%, the predetermined value assumed by the conduction time is equal to $<d_i>\alpha$ where $\alpha$ is a linearization coefficient;

the random values are generated by a random number generator over n bits, the reference values chosen for the mean cyclic ratio being encoded over n bits.

A further object of the invention is a device comprising:

at least one pulse switch to drive the load, a chopper circuit to generate a switching signal, said switching signal being defined by its cyclic ratio and its switching period, said cyclic ratio being maintained at a level corresponding to the voltage or current intensity desired for the load, a ripple being induced onto said voltage or intensity by the switching signal (s), a chopper circuit control unit, wherein the control unit chooses the cyclic ratio and the switching period of the switching signal in such a way that the induced ripple is submerged in the natural noise frequencies of the load.

Preferably, the switching period and cyclic ratio of the pulse switch are variable.

Advantageously, this device comprises a random number generator linked to the chopper circuit.

BRIEF DESCRIPTION OF THE DRAWINGS

The following description of a particular embodiment of the invention is purely illustrative and non-limiting. It should be read in conjunction with the accompanying drawings. In these drawings.

DETAILED DESCRIPTION

Figure 1:
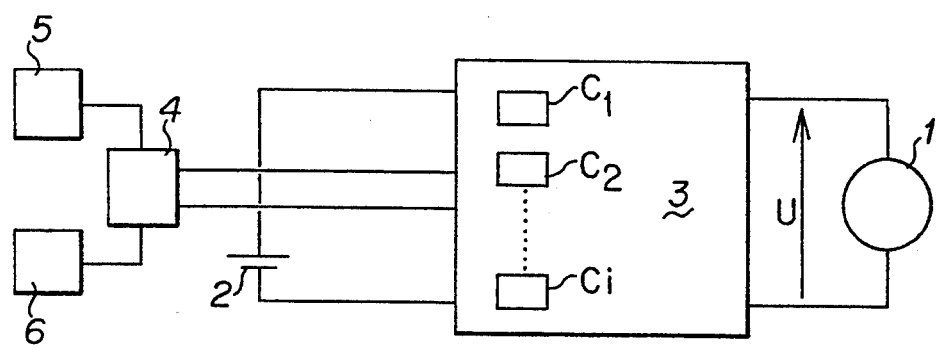
FIG. 1 shows a block diagram of a control circuit including a device in accordance with the invention.

Referring now to FIG. 1, this Figure shows a drawing of a control circuit for controlling an electromechanical load 1. This control circuit, fed from a dc source 2, principally consists of a converter 3 in which pulse switches Ci that drive load 1 are fitted. This converter 3 and the pulse switches it contains, receive binary switching signals from a chopper 4. Chopper 4 is controlled by a random number generator 5, which generates random numbers over n bits of average value $2^{n-1}$ and a control unit 6

Figure 2A:
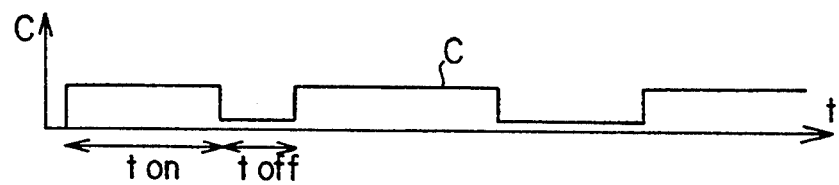
FIGS. 2a and 2b diagrammatically show, first, the control signal of a pulse switch and secondly, the instantaneous and mean voltage at the terminals of an electromechanical load driven by such a pulse switch.
Figure 2B:
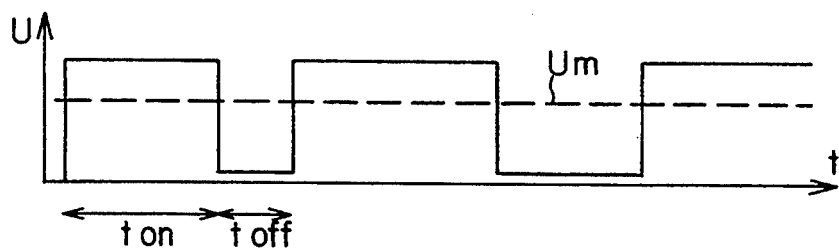

Referring now to FIGS. 2a and 2b, FIG. 2a shows the signal c received by a pulse switch $C_i$ in converter 3. This signal is a cyclic binary signal which successively assumes the values 0 or 1 during respectively a blocking time $t_{off}$ and a conduction time $t_{on}$. This signal c controls the current or voltage supplying load 1. As shown in FIG. 2b, the value of the mean voltage Um on the terminals of load 1 is proportional to the switching cyclic ratio:

$$d_i = t_{on}/(t_{on}+t_{off})$$

The random number generator 5 and the control unit 6 control the chopper circuit 4 to make it modulate the pulse width of the control signals c. This modulation is such that for a switch $C_i$, the mean value $<T_i>$ of the switching period $T_i = t_{on}+t_{off}$ is centered on the natural noise of the electromechanical load 1, while the mean value $<d_i>$ of the switching cyclic ratio $d_i$ of this switch $C_i$ corresponds to the cyclic ratio value desired to control the voltage U of the load 1. Switches $C_i$ are chosen for a variable switching period $T_i$ and a variable switching cyclic ratio $d_i$.

Figure 3:
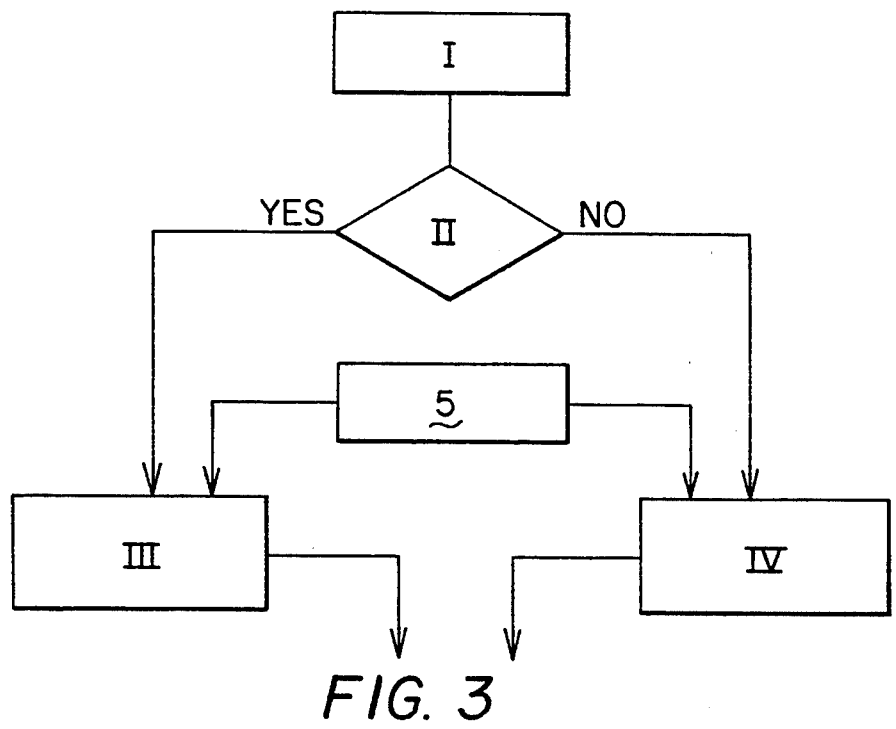
FIG. 3 diagrammatically illustrates the operation of the method in accordance with the invention.

Referring now to FIG. 3, this Figure shows certain stages in the noise reduction method in accordance with the invention.

In a first stage I, an external operator such as a pick-up sends a mean switching period value $<T_i>$ to unit 6. This value is chosen so as to be centered on the natural acoustic noise of the electromechanical load. It can correspond to very low switching frequencies (50 OHz–1 kHz). An input reference $<d_i>$ is also given to unit 6. This input reference $<d_i>$ is chosen to correspond to the desired value of the mean cyclic ratio of the switch controlling the current or voltage level in electromechanical load 1. This reference value $<d_i>$ is encoded over n bits, its maximum value being $2^n$.

In a second stage II, a test is conducted to ascertain whether this cyclic ratio reference is greater or less than 50%.

If this reference value is greater than 50%, the control unit 6 adjusts the clock of the chopper circuit 4 in such a way that the mean time $<T_i>$ chosen in stage I corresponds to an encoded value of:

$$+2^{n-1}+(2^n-<d_i>)$$

sent by unit 6 or generator 5.

In a stage III, the chopper circuit 4 successively assigns a random value to conduction time $t_{on}$, this random value being sent to it by the random number generator 5. Moreover, chopper circuit 4 assigns a constant value to blocking time $t_{off}$, namely:

$$2^n - <d_i>$$

possibly corrected by a linearization coefficient $\alpha$. This constant value is sent to it by control unit 6.

If, on the other hand, the input reference $<d_i>$ is less than 50% in stage II, corresponding to the case where the blocking time $t_{off}$ is on average greater than the conduction time $t_{on}$, the control circuit 6 adjusts the clock of the chopper circuit 4 in such a way that the mean time $<T_i>$ corresponds to a value:

$$2^{n-1}+<d_i>$$

sent by unit 6 or generator 5. In a IV stage similar to stage III, chopper circuit 4 generates switching signals whose blocking time $t_{off}$ has a random value sent to it by generator 5, whereas the conduction time $t_{on}$ assumes a constant value $<d_i>$ imposed by control unit 6. This constant value can be corrected by a linearization coefficient $\alpha$.

Thus, in the first case, the mean value of the switching period is:

$$2^{n-1}+2^n - <d_i>$$

in the second case, the mean value of this switching period is:

$$<d_i> + 2_{n-1}.$$

In both cases, taking account of the adjustment made to the chopper circuit clock at the stage II level, the value of the mean of the switching period is indeed the value $<T_i>$ initially chosen.

During operation, the input reference $<d_i>$ is of course likely to vary according to the voltage or current desired to drive the load 1. It is important to note that no discontinuity will exist at the level of the switching period or blocking or conduction times when passing from a value of $<d_i>$ that is greater than 50% to a value that is less than 50% (and reciprocally) since for an encoding over n bits, the value 50% corresponds to $2^{n-1}$, i.e., the mean of the random numbers, with a random element over n bits.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and equivalents thereto.

What is claimed is:

1. A method for controlling an electromechanical load driven by at least one electronic pulse switch converter, comprising the steps of:

receiving, by said converter, at least one binary switching signal defined by a cyclic ratio and a switching period, controlling at least one of a current intensity and a voltage intensity to a level desired for the load, varying the switching period to submerge a ripple induced, by the at least one switching signal, on at least one of the current intensity and the voltage intensity in natural noise frequencies of the load, varying the cyclic ratio to submerge a ripple induced, by the at least one switching signal, on at least one of the current intensity and the voltage intensity in natural noise frequencies of the load, wherein a mean of the switching period corresponds to a period of a frequency of a natural noise of the load, wherein each switching period comprises a conduction time and a blocking time and wherein a random value is introduced into at least one of the switching period and the blocking time and the conduction time, further comprising the step of, for a given natural noise level of the load and for a given load control intensity of voltage level, assigning at least one of the blocking time and the conduction time of each switching pulse a constant value according to at least one of the intensity and the voltage level, and the mean switching period, further comprising the step of assigning a randomly chosen value to at least one of a supplementary blocking time and a conduction time for the switching pulse, further comprising the steps of determining a mean cyclic ratio desired for the switch, determining whether the mean cyclic ratio is greater or less than 50%, and if the mean cyclic ratio value is greater than 50%, assigning the conduction time of a switching pulse a random value and the blocking time a predetermined constant value chosen so that the cyclic ratio assumes the mean value, if the mean cyclic ratio value is less than 50%, assigning the blocking time of a switching pulse a random value and the conduction time a predetermined constant value chosen so that the cyclic ratio assumes the mean value, the conducting time and blocking time in both cases being brought to a temporal value such that the mean switching period assumes a value corresponding to the natural noise of the load.

2. The method of claim 1, wherein if the mean cyclic ratio desired is greater than 50%, setting the predetermined value of the constant blocking time of each switching pulse equal to $(1 - <d_i>) \alpha$ where $\alpha$ is a linearization coefficient and wherein $<d_i>$ is the mean cyclic ratio, and wherein if the mean cyclic ratio desired is less than 50%, setting the predetermined value of the conduction time equal to $(<d_i>) \alpha$.

3. The method of claim 2, further comprising the step of generating the random values using a random number generator over a number of bits, reference values chosen for the mean cyclic ratio being encoded over a number of bits.

4. A device comprising:

at least one pulse switch to drive an electromechanical load, a chopper circuit coupled to the switch to generate a switching signal to control said switch, said switching signal being defined by a cyclic ratio and a switching period, said cyclic ratio being maintained at a level corresponding to a voltage or current level desired for the load, a ripple being induced on said voltage or current by the switching signal, a control unit coupled to the chopper circuit, wherein the control unit chooses the cyclic ratio and the switching period of the switching signal so that a frequency of the induced ripple is submerged in the natural noise frequencies of the load.

5. The device of claim 4, wherein the switching period and cyclic ratio of the pulse switch are variable.

6. The device of claim 5, further comprising a random number generator linked to the said chopper circuit.

7. An apparatus for controlling an electromechanical load, comprising:

means for supplying a voltage or current to the load;

means, coupled to the means for supplying, for generating a switching signal to control the means for supplying, the switching signal having a cyclic ratio and a switching period wherein the cyclic ratio is maintained at a level so that the means for supplying supplies a desired voltage or current to the load; and means, coupled to the means for generating, for controlling the cyclic ratio and the switching period of the switching signal so that a frequency of a ripple induced on the desired voltage or current by the switching signal is submerged in at least one noise frequency of the load.

8. The apparatus of claim 7, wherein the at least one noise frequency includes the natural noise frequencies of the load.

9. The apparatus of claim 8, further comprising means, coupled to the means for generating, for providing random numbers used to determine the switching period of the switching signal.

10. The apparatus of claim 9, wherein the switching period includes a conduction time and a blocking time, and wherein the means for controlling assigns at least one of the blocking time and the conduction time a constant value according to at least one of the voltage and the current, and a mean switching period, and assigns a random value to at least one of a supplementary blocking time and a conduction time.

11. An apparatus for controlling an electromechanical load, comprising:

means for supplying a voltage or current to the load;

means, coupled to the means for supplying, for generating a switching signal to control the means for supplying, the switching signal having a cyclic ratio and a switching period wherein the cyclic ratio is maintained at a level so that the means for supplying supplies a desired voltage or current to the load;

means, coupled to the means for generating, for controlling the cyclic ratio and the switching period of the switching signal so that a frequency of a ripple induced on the desired voltage or current by the switching signal is submerged in at least one noise frequency of the load;

wherein the at least one noise frequency includes the natural noise frequencies of the load;

further comprising means, coupled to the means for generating, for providing random numbers used to determine the switching period of the switching signal;

wherein the switching period includes a conduction time and a blocking time, and wherein the means for controlling assigns at least one of the blocking time and the conduction time a constant value according to at least one of the voltage and the current; and a mean switching period; and assigns a random value to at least one of a supplementary blocking time and a conduction time;

wherein the means for controlling determines the mean cyclic ratio and whether the mean cyclic ratio is greater than or less than 50% and, if the mean cyclic ratio value is greater than 50%, assigns the conduction time a random value and the blocking time a predetermined constant value so that the cyclic ratio is substantially equal to the mean value.

12. The apparatus of claim 11, wherein the means for controlling determines the mean cyclic ratio and whether the mean cyclic ratio is greater than or less than 50% and, if the mean cyclic ratio is less than 50%, assigns the blocking time a random value and the conduction time a predetermined constant value so that the cyclic ratio is substantially equal to the mean value.

13. The apparatus of claim 12, wherein, if the mean cyclic ratio is greater than 50%, the means for controlling sets the predetermined value of the constant blocking time substantially equal to $$(1-<d_i>)\alpha$$

wherein $\alpha$ is a linearization coefficient and wherein $<d_i>$ is the mean cyclic ratio.

14. The apparatus of claim 13, wherein, if the mean cyclic ratio is less than 50%, the means for controlling sets the predetermined value of the conduction time equal to $$(<d_i>)\alpha.$$

* * * * *

UNITED STATES PATENT AND TRADEMARK OFFICE
CERTIFICATE OF CORRECTION

PATENT NO. : 5,442,535
DATED : August 15, 1995
INVENTOR(S) : John M. Bourgeios

It is certified that error appears in the above-indentified patent and that said Letters Patent is hereby corrected as shown below:

Title page:

At [54] Please change

"METHOD AND APPARATUS FOR CONTROLLING AN ELECTROMECHANICAL LOAD BY LEAST ONE PULSE SWITCH"

To

--METHOD AND APPARATUS FOR CONTROLLING AN ELECTROMECHANICAL LOAD USING A VARIABLE SWITCHING PERIOD AND CYCLIC RATIO--

Signed and Sealed this

Seventh Day of November, 1995

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,442,535
DATED : August 15, 1995
INVENTOR(S) : Jean-Marie Bourgeois It is certified that error appears in the above-indentified patent and that said Letters Patent is hereby corrected as shown below:

On the Title Page, Item [75] Inventor, should read
Jean-Marie Bourgeois, Roqueford la Bedoule, France Item [19] should read --Bourgeois Signed and Sealed this Eighteenth Day of June, 1996

Attest:

BRUCE LEHMAN

*Attesting Officer*         *Commissioner of Patents and Trademarks*